(12) United States Patent
Hung et al.

(10) Patent No.: US 10,130,950 B2
(45) Date of Patent: Nov. 20, 2018

(54) MICROFLUIDIC DROPLET PACKING

(71) Applicant: Bio-Rad Laboratories, Inc., Hercules, CA (US)

(72) Inventors: Tony Hung, Cambridge, MA (US);
Sepehr Kiani, Watertown, MA (US);
Scott Powers, Cambridge, MA (US);
Adnan Esmail, Boston, MA (US)

(73) Assignee: Bio-Rad Laboratories, Inc., Hercules, CA (US)

( * ) Notice: Subject to any disclaimer, the term of this patent is extended or adjusted under 35 U.S.C. 154(b) by 4 days.

(21) Appl. No.: 15/039,637

(22) PCT Filed: Nov. 25, 2014

(86) PCT No.: PCT/US2014/067417
§ 371 (c)(1),
(2) Date: May 26, 2016

(87) PCT Pub. No.: WO2015/081102
PCT Pub. Date: Jun. 4, 2015

(65) Prior Publication Data
US 2017/0165669 A1    Jun. 15, 2017

Related U.S. Application Data

(60) Provisional application No. 61/909,543, filed on Nov. 27, 2013, provisional application No. 61/934,190, filed on Jan. 31, 2014.

(51) Int. Cl.
*B01L 3/00* (2006.01)
*B01J 19/00* (2006.01)
*B01L 7/00* (2006.01)

(52) U.S. Cl.
CPC ..... *B01L 3/502784* (2013.01); *B01J 19/0093* (2013.01); *B01L 3/502715* (2013.01);
(Continued)

(58) Field of Classification Search
CPC ........... B01L 3/502784; B01J 19/0093; G01N 33/48; C12Q 1/68; C12M 1/00
See application file for complete search history.

(56) References Cited

U.S. PATENT DOCUMENTS 8,528,589 B2    9/2013  Miller et al.
8,535,889 B2    9/2013  Larson et al.
(Continued)

FOREIGN PATENT DOCUMENTS

EP    2364774 A2    9/2011
EP    2662135 A2    11/2013
(Continued)

OTHER PUBLICATIONS

PCT-US2014-067417, "International Search Report and Written Opinion", dated Feb. 12, 2015, 13 pages.
(Continued)

*Primary Examiner* — Narayan K Bhat
(74) *Attorney, Agent, or Firm* — Kilpatrick Townsend and Stockton LLP (57) ABSTRACT

Systems and methods for confining droplets within a microfluidic channel as well as systems and methods for packing droplets are provided. More specifically, a system and method are provided for controlling the introduction and removal of oil into a microfluidic channel in order to control where drops are allowed to flow within that channel.

13 Claims, 7 Drawing Sheets

(52) U.S. Cl.
CPC .......... *B01J 2219/0086* (2013.01); *B01J 2219/00783* (2013.01); *B01J 2219/00792* (2013.01); *B01J 2219/00828* (2013.01); *B01J 2219/00831* (2013.01); *B01J 2219/00833* (2013.01); *B01J 2219/00837* (2013.01); *B01J 2219/00855* (2013.01); *B01J 2219/00873* (2013.01); *B01J 2219/00889* (2013.01); *B01J 2219/00894* (2013.01); *B01J 2219/00903* (2013.01); *B01J 2219/00934* (2013.01); *B01L 3/502776* (2013.01); *B01L 7/525* (2013.01); *B01L 2200/0673* (2013.01); *B01L 2300/0816* (2013.01); *B01L 2300/0858* (2013.01); *B01L 2300/0867* (2013.01); *B01L 2400/0487* (2013.01)

(56) References Cited

U.S. PATENT DOCUMENTS

| | | |
|---|---|---|
| 2008/0261295 A1 | 10/2008 | Butler |
| 2011/0151578 A1 | 6/2011 | Abate et al. |
| 2011/0218123 A1 | 9/2011 | Weitz et al. |
| 2011/0250597 A1 | 10/2011 | Larson et al. |
| 2011/0267457 A1 | 11/2011 | Weitz et al. |
| 2012/0015822 A1 | 1/2012 | Weitz et al. |
| 2012/0121480 A1 | 5/2012 | Frenz et al. |
| 2012/0132288 A1 | 5/2012 | Weitz et al. |
| 2012/0219947 A1 | 8/2012 | Yurkovetsky et al. |
| 2012/0220494 A1 | 8/2012 | Samuels et al. |
| 2012/0222748 A1 | 9/2012 | Weitz et al. |
| 2012/0309002 A1 | 12/2012 | Link |
| 2013/0344485 A1 | 12/2013 | Raz et al. |
| 2014/0198313 A1 | 7/2014 | Tracy et al. |
| 2014/0354795 A1 | 12/2014 | Tracy et al. |
| 2015/0024945 A1 | 1/2015 | Healy |
| 2015/0045258 A1 | 2/2015 | Raz et al. |
| 2015/0065396 A1 | 3/2015 | Kiani et al. |
| 2015/0093815 A1 | 4/2015 | Kiani et al. |
| 2015/0094232 A1 | 4/2015 | Abate et al. |
| 2015/0209785 A1 | 7/2015 | Esmail et al. |
| 2015/0321163 A1 | 11/2015 | Hung et al. |
| 2015/0375229 A1 | 12/2015 | Possinger et al. |
| 2016/0001289 A1 | 1/2016 | Hung et al. |

FOREIGN PATENT DOCUMENTS

| | | |
|---|---|---|
| GB | 2392397 A | 3/2004 |
| WO | 2007-081385 A2 | 7/2007 |
| WO | 2007-081387 A1 | 7/2007 |
| WO | 2009/010719 A1 | 1/2009 |
| WO | 2011/079176 A2 | 6/2011 |
| WO | 2012-078710 A1 | 6/2012 |
| WO | 2012-135201 A1 | 10/2012 |
| WO | 2012-135259 | 10/2012 |
| WO | 2012-135259 A1 | 10/2012 |
| WO | 2012-135327 A1 | 10/2012 |
| WO | 2013-095737 A2 | 6/2013 |
| WO | 2013-122826 A1 | 8/2013 |
| WO | 2013-165748 A1 | 11/2013 |
| WO | 2014-043388 A1 | 3/2014 |
| WO | 2014-093976 A1 | 6/2014 |
| WO | 2014-117088 A1 | 7/2014 |
| WO | 2014-176599 A1 | 10/2014 |
| WO | WO 2014/186440 | * 11/2014 |

OTHER PUBLICATIONS

PCT-US2014-067417, "International Preliminary Report on Patentability", dated Jun. 9, 2016, 10 pages.

Supplemental Partial European Search Report in Application No. 14865870.1 dated Jul. 26, 2017; 15 pages.

* cited by examiner

MICROFLUIDIC DROPLET PACKING

CROSS-REFERENCES TO RELATED APPLICATIONS

The present application is the US National Stage entry of PCT/US2014/067417, filed Nov. 25, 2014 which claims benefit of priority to US Provisional Application No. 61/909,543, filed on Nov. 27, 2013 and US Provisional Patent Application No. 61/934,190, filed on Jan. 31, 2014, each of which is incorporated by reference for all purposes.

BACKGROUND OF THE INVENTION

Microfluidic processes often employ the use of an emulsion, which contains drops of a dispersed liquid phase surrounded by an immiscible continuous liquid phase. Drops may be used as reaction vessels for chemical or biological reactions, as storage vessels, and/or as a method to isolate and compartmentalize molecules, such as chemical or biological elements. With proper chemistry such as surfactants on the surface of the emulsion, drops may be made "stable," meaning they are substantially prevented form mixing and merging when in contact with each other. This stability allows one to create a population or library of drops composed of different chemical or biological components that may be stored in the approximately same volume of space without mixing or contamination between and/or among the components of one drop and another.

In some cases, drops within a microfluidic device flow within microfluidic channels in order to access different areas of the device. As the drops flow throughout the channels within the microfluidic device, the drops often mix and rearrange themselves, resulting in the loss of defined arrangement of drops, causing issues downstream in drop packing for a number of processes, drop detection and data analysis. In some cases, the diameter of a particular channel or portion of a channel (e.g., a widening or narrowing channel) is a significant factor associated with the problem in maintaining the arrangement of drops and drop packing within a channel. Accordingly, there is a need for a system and method for maintaining the arrangement of drops within a microfluidic channel via drop confinement.

BRIEF SUMMARY OF THE INVENTION

In some aspects, a system and method for confining drops within a microfluidic channel are provided. More specifically, a system and method are provided for controlling the introduction and removal of oil into a microfluidic channel in order to control where drops are allowed to flow within that channel. In some embodiments, a microfluidic system is used. As an example, in some embodiments, the aspects described herein can be used in a system as described in PCT/US2013/5917 or in a system such as in FIG. 1.

In some embodiments, additional channel inlets are incorporated at specific points to the microfluidic channel, connected by port channels. The inlets are filled with the same oil for aqueous phase emulsion as that which is in the drop (emulsion)-containing channel. By manipulating the pressure associated with each inlet, the area of the channel to be used for drop flow may increase, decrease, and/or shift within the channel. This channel manipulation results in the ability to control downstream drop packing, redirect the flow of drops, more easily control drop sorting and drop partitioning, and ultimately more precise data analysis.

In some embodiments, additional channel inlets are incorporated progressively along the length of the channel. In some embodiments, at least some inlets are used for the removal of oil from aqueous phase emulsion within the channel, allowing the drops within the channel to pack closer together gradually as they move downstream within the channel, e.g., until the drops are fully packed (e.g., at the desired, higher, density). At the point downstream where the drops are packing within the channel, a pressure source is introduced to slightly impede flow of drops past this packing area while an oil-removing inlet is gently removing oil from the channel. Once drop packing has been achieved, the pressure source is removed and packing is maintained within the channel.

In some aspects, a method of controlling aqueous droplets in an emulsion comprising a non-aqueous continuous fluid is provided. In some embodiments, the method comprises providing a microfluidic channel defined by two substantially parallel or non-parallel walls, wherein each wall comprises one or more opposing ports, wherein said microfluidic channel contains an emulsion comprising aqueous droplets in the continuous non-aqueous fluid; and causing the emulsion to flow from an upstream position in the microfluidic channel to a downstream position in the channel while introducing non-emulsion continuous non-aqueous fluid into the microfluidic channel from the ports, such that the aqueous droplets in the emulsion are more densely packed at the downstream position compared to the upstream position.

In some embodiments, non-emulsion continuous (e.g., non-aqueous) fluid from one or more port on a first wall of the microfluidic channel flows at a stronger pressure than non-emulsion continuous non-aqueous fluid from port(s) of the opposing wall such that a majority of droplets at the downstream position are closer to the opposing wall than to the first wall of the microfluidic channel.

In some embodiments, each wall of the microfluidic channel comprises at least an upstream port and a downstream port, wherein the upstream port in each wall introduces non-emulsion continuous non-aqueous fluid into the microfluidic channel at a first pressure and wherein the downstream port in each wall introduces non-emulsion continuous non-aqueous fluid into the microfluidic channel at a second pressure.

In some embodiments, the first pressure and the second pressure are the same. In some embodiments, the first pressure is higher than the second pressure. In some embodiments, the first pressure is lower than the second pressure.

In some embodiments, the ports provide fluid communication between the microfluidic channel and one or more side channels, wherein the side channels and the microfluidic channel form an angle less than 90 degrees as measured from the side channel and the upstream portion of the microfluidic channel. In some embodiments, the angle is between 30-60 degrees.

In some aspects, methods of removing continuous non-aqueous fluid from an emulsion are provided. In some embodiments, the method comprises providing a microfluidic channel defined by two substantially parallel walls, wherein at least one wall comprises one or more port(s), wherein the ports provide fluid communication between the microfluidic channel and one or more side channels, wherein said microfluidic channel contains an emulsion comprising aqueous droplets in the continuous non-aqueous fluid; and causing the emulsion to flow from an upstream position in the microfluidic channel to a downstream position in the microfluidic channel while removing non-emulsion continuous non-aqueous fluid from the emulsion in the microfluidic channel via the port(s), wherein the side channels and the microfluidic channel form an angle less than 90 degrees as measured from the side channel and the upstream position of the microfluidic channel, thereby removing continuous non-aqueous fluid from the emulsion. In some embodiments, the angle is between 30-60 degrees.

In some embodiments, the method further comprises providing at the downstream position a fluid pressure opposing the flow of the emulsion, thereby packing the droplets of the emulsion into a more dense arrangement than occurred at the upstream position. In some embodiments, the pressure is provided by fluid inserted into the microfluidic channel by a downstream port in fluid communication with the microfluidic channel. In some embodiments, the fluid is a continuous non-aqueous fluid. In some embodiments, the fluid is an aqueous fluid.

Also provided are systems for controlling flow in a microfluidic channel. In some embodiments, the system comprises: a microfluidic channel defined by two substantially parallel walls wherein at least one wall comprises one or more port(s), wherein:
the ports provide fluid communication between the microfluidic channel and one or more side channels,
the microfluidic channel contains an emulsion comprising aqueous droplets in the continuous non-aqueous fluid,
the microfluidic channel comprises an upstream position and a downstream position, and the side channels and the microfluidic channel form an angle less than 90 degrees as measured from the side channel and the upstream position of the microfluidic channel.

In some embodiments, the system further comprises a port in fluid communication with the microfluidic channel at the downstream position to provide fluid pressure towards the upstream position.

In some embodiments, the angle is between 30-60 degrees.

Also provided is a system for controlling flow in a microfluidic channel. In some embodiments, the system comprises a microfluidic channel defined by two substantially parallel walls, wherein each wall comprises one or more opposing ports, wherein said microfluidic channel contains an emulsion comprising aqueous droplets in the continuous non-aqueous fluid, and said ports being in fluid communication with one or more side channels containing a non-emulsion continuous non-aqueous fluid.

In some embodiments, the side channels and the microfluidic channel form an angle less than 90 degrees as measured from the side channel and the upstream position of the microfluidic channel. In some embodiments, the angle is between 30-60 degrees.

In some cases, droplets injected into a large incubator channel do not pack uniformly and can create a problem of unordered rearrangements. In some embodiments, filler drops capable of filling the cross-sectional area of the channel are created at a junction upstream of the large channel and slowly fill the channel, optionally before the regular sized droplets in an emulsion are able to begin to flow. These filler drops impede the flow of smaller drops, but not the flow of oil, thus allowing the small drops to pack together at a higher concentration than their incoming concentration. The "filler drops" can be of a size such that they can fill or substantially fill the cross-sectional area of the "downstream" channel and such that the filler drops cause improved packing of the emulsion droplets.

In some aspects, methods of packing droplets in a microfluidic channel. In some embodiments, the method comprises providing a microfluidic channel containing an emulsion comprising aqueous droplets within a non-emulsion continuous non-aqueous fluid, wherein the microfluidic channel has an upstream and a downstream position and is in fluid communication with an injection inlet at the upstream position, said injection inlet in fluid communication with a subchannel containing non-emulsion continuous non-aqueous fluid; causing the emulsion to flow from an upstream position in the microfluidic channel to a downstream position in the microfluidic channel, wherein the downstream position of the microfluidic channel contains one or more filler drop(s) at least twice as large as the average droplet in the emulsion; and filtering droplets in the emulsion past the filler drop(s), thereby packing the droplets at an end position beyond the downstream position.

In some embodiments, the filler drop(s) is injected into the microfluidic channel at a filler drop injection position in the microfluidic channel between the upstream position and the downstream position. In some embodiments, the microfluidic channel at the downstream position is wider than the microfluidic channel at the upstream position of the microfluidic channel and the microfluidic channel at the filler drop injection position is substantially the same width as the microfluidic channel at the downstream position. In some embodiments, the microfluidic channel at the downstream position is wider than the microfluidic channel at the upstream position of the microfluidic channel and the microfluidic channel at the filler drop injection position is substantially the same width as the microfluidic channel at the upstream position.

In some embodiments, the downstream position of the microfluidic channel is wider than the upstream position of the microfluidic channel.

In some embodiments, an inlet is in communication with the microfluidic channel at the upstream position and non-emulsion continuous phase is injected from the inlet into the microfluidic channel.

Also provided is a microfluidic system. In some embodiments, the system comprises a microfluidic channel containing an emulsion comprising aqueous droplets within a non-emulsion continuous non-aqueous fluid, wherein the microfluidic channel has an upstream and a downstream position and is in fluid communication with an injection inlet at the upstream position, said injection inlet in fluid communication with a subchannel containing non-emulsion continuous non-aqueous fluid; and an injection port at a filler drop injection position in the microfluidic channel between the upstream position and the downstream position, wherein the injection port is in fluid communication with a chamber comprising a fluid immiscible in the non-emulsion continuous non-aqueous fluid.

In some embodiments, the microfluidic channel at the downstream position is wider than the microfluidic channel at the upstream position of the microfluidic channel and the microfluidic channel at the filler drop injection position is substantially the same width as the microfluidic channel at the downstream position.

In some embodiments, the microfluidic channel at the downstream position is wider than the microfluidic channel at the upstream position of the microfluidic channel and the microfluidic channel at the filler drop injection position is substantially the same width as the microfluidic channel at the upstream position.

In some embodiments, the downstream position of the microfluidic channel is wider (e.g., at least 1.1, 1.5, 2, 2.5, 3× or more e.g., 1.1-5×) than the upstream position of the microfluidic channel.

In some embodiments, the system further comprises an inlet at the upstream position of the channel for providing continuous phase into the microfluidic channel.

DEFINITIONS

A "sample(s)", "one or more samples", or "sample(s) of interest" are terms used interchangeably in singular or plural form and are not intended to be limited to any particular quantity and, as used herein, may be any molecule or substance that the user wishes to gather information from. A sample may become larger or smaller (e.g., by way of inflation or partitioning, respectively) in size, volume or content during the performance of an assay. Accordingly, a sample may be amplified and/or subdivided one or more times during the performance of an assay. In some embodiments, the sample comprises nucleic acids.

A "fluid", as used herein, is any aqueous or lipophilic phase capable of flowing freely. Two or more fluids may flow in a manner referred to as "co-flowed" such that the flow of each fluid is laminar in the same direction within the range or timescale of the operation of the system but such that they are not substantially mixing. The fluid and/or emulsion injected into or out of a droplet may further comprise one or more reagents, reaction components or samples of interest selected from cells (including any eukaryotic or prokaryotic cells, including but not limited to cells selected from humans, animals, plants, fungi, bacteria, viruses, protozoa, yeasts, molds, algae, rickettsia, and prions); proteins, peptides, nucleic acid sequences, oligonucleotide probes, polymerase enzymes, buffers, dNTPs, organic and inorganic chemicals, and fluorescent dyes.

An "emulsion," as used herein, is a stable mixture of at least two immiscible or partially immiscible liquids. In general, immiscible liquids tend to separate into two distinct phases. Accordingly, a surfactant may be added to stabilize the emulsion by reducing surface tension between the at least two immiscible or partially immiscible liquids and/or to stabilize the interface. For example, an emulsion according to the systems, methods and kits of this invention may comprise a plurality of aqueous drops in an immiscible oil, such as fluorocarbon oil, silicon oil or hydrocarbon oil (including, but not limited to, petroleum and mineral oil) where the drop size ranges from about 0.5 to about 5000 microns in diameter.

A "microfluidic device", as used herein, is a device that enables a means of effecting a deterministic function on liquid or gas fluids at small scales typically measured in volumes such as, for example, milliliter (mL), microliter (µL), nanoliter (nL), picoliter (pL), or femtoliter (fL) volumes and/or by physical scale such as millimeter (mm), micrometer (µm) (also referred to as "micron"), nanometer (nm), and so forth. Functions may include mixing, splitting, sorting, heating, and so forth. Microfluidic devices may comprise microfluidic channels as a means for transferring fluids or samples from one point to another and are typically of uniform cross section in the mm, µm or nm scale.

DETAILED DESCRIPTION OF THE INVENTION

Figure 1:
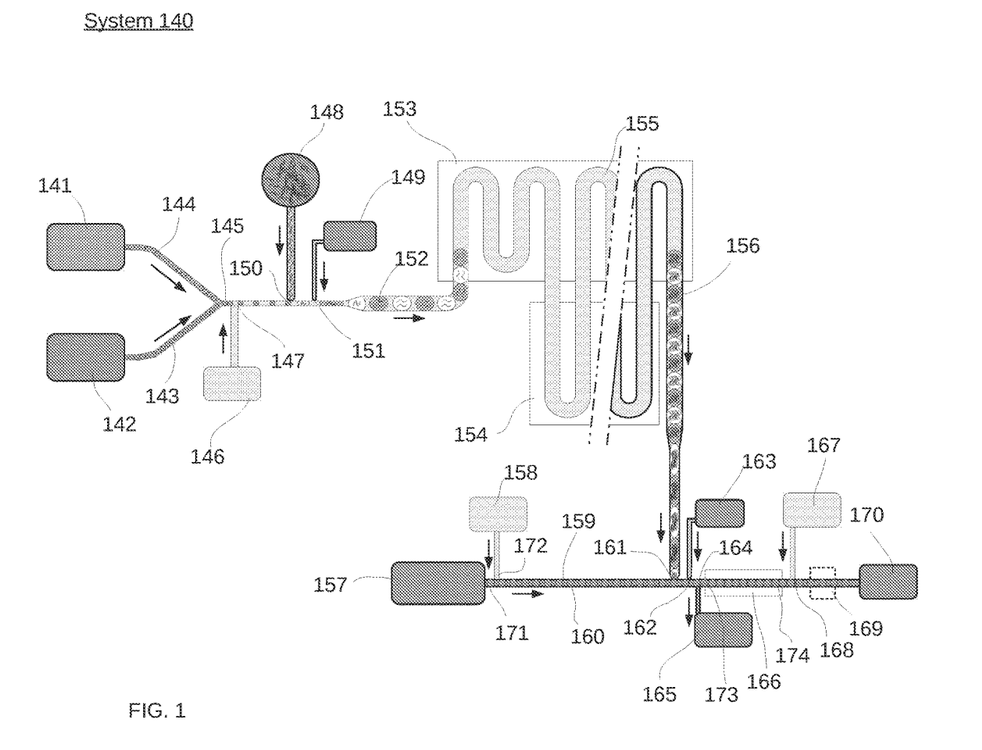
FIG. 1 is an illustration of an example of one embodiment of a microfluidic system, which is performing a cascading assay.

A variety of aspects for use in microfluidic systems are provided herein, including but not limited to methods of packing droplets and controlling emulsion flow within a microfluidic channel. The methods, devices and systems described herein can be used in isolation or adapted to any number of different microfluidic system configurations. One such system is depicted in FIG. 1. It should be recognized that the system of FIG. 1 is not intended to limit the invention. For example, aspects of the system of FIG. 1 can be used in separation from other aspects of the system while using the inventive configurations described herein.

Controlling Droplets Flow in a Microfluidic Channel

In some aspects, a system and method is provided for confining drops within a portion of a microfluidic channel. More specifically, the present system provides for a system and method for controlling the introduction and removal of oil into a microfluidic channel in order to control where drops are allowed to flow within that channel.

Figure 2:
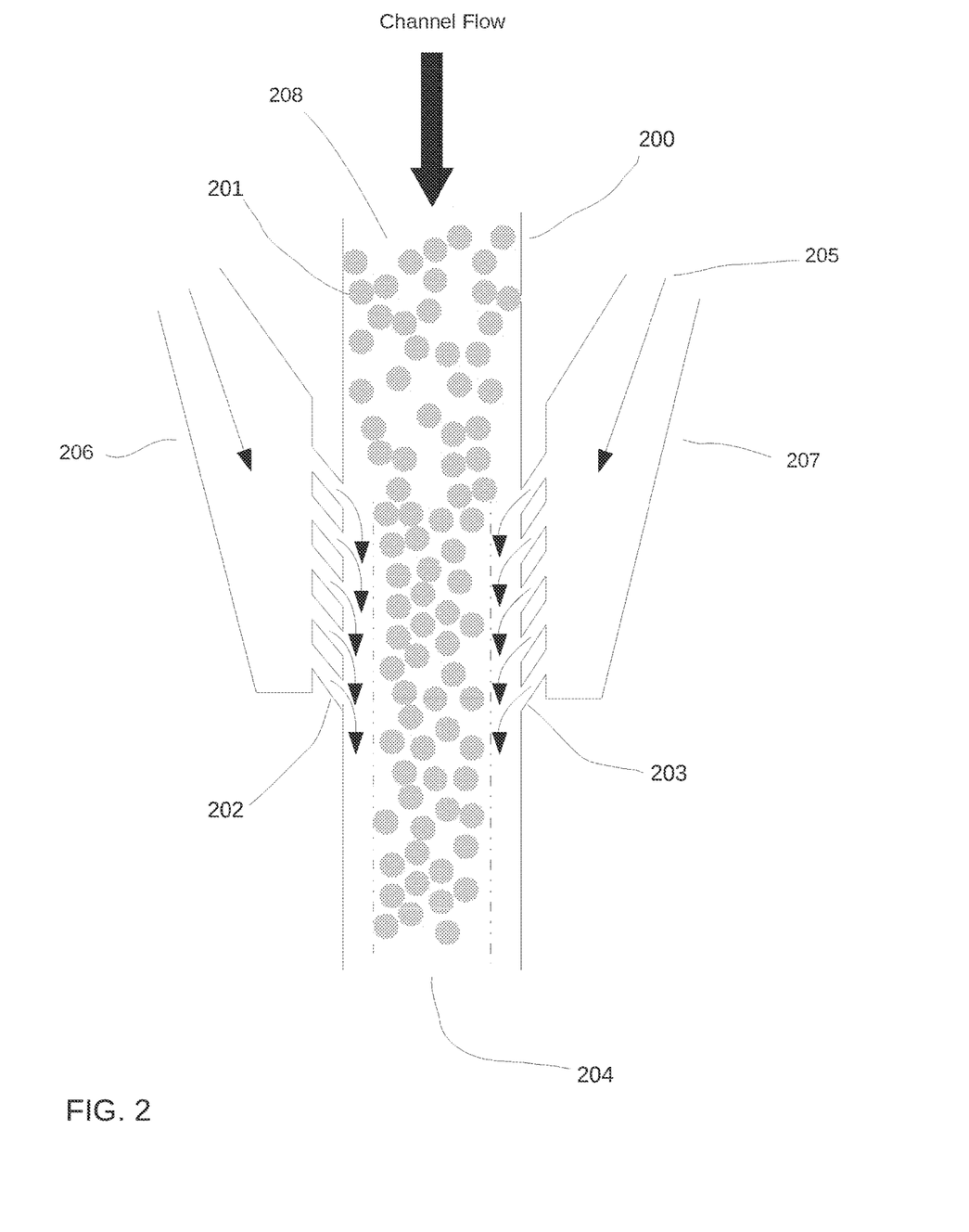
FIG. 2 is an illustration of an example of one embodiment of a microfluidic channel with incorporated additional inlet channels with each inlet channel having the same low pressure, resulting in a slight confinement of drops within the microfluidic channel relative to the physical boundaries of the channel itself.

FIG. 2 is an illustration of an example of one embodiment of the system for performing emulsion channel confinement. A microfluidic channel 200 contains drops 201 in an oil continuous phase 208. The drops flow down the channel 200 until more oil 208 is introduced 205 from inlet channels 206 and 207 via flow ports 202 and 203. In this example, oil 208 is being introduced 205 to channel 200; however, it is noted that in another example, oil 208 may be removed from channel 200 via the opposing ports. In FIG. 2, the pressures set in inlets 206 and 207 are at a low but equal setting, resulting in a slightly constrained flow area 204 within the channel 200. Another result of this constrained flow 204 is the subsequent packing of drops 201, which can also be controlled by altering pressure from inlets 206 and 207.

Figure 3:
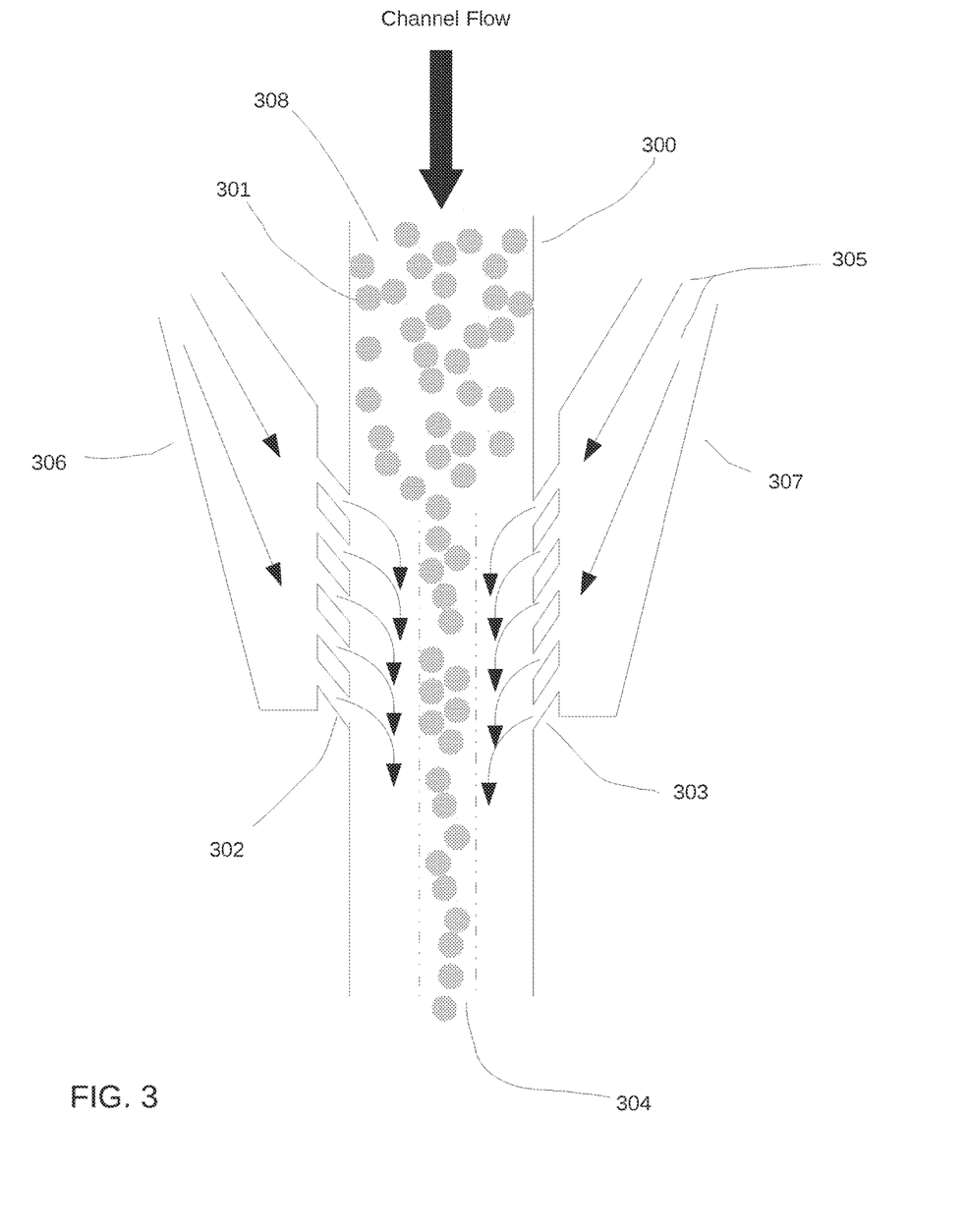
FIG. 3 is an illustration of an example of one embodiment of a microfluidic channel with incorporated additional inlet channels with each inlet having the same high pressure, resulting in a significant confinement of drops within the microfluidic channel relative to the physical boundaries of the channel itself.

FIG. 3 is an illustration of an embodiment of the system for performing emulsion channel confinement. A microfluidic channel 300 contains drops 301 in an aqueous oil emersion 308. The drops flow down the channel 300 until more oil 308 is introduced 305 from inlet channels 306 and 307 via opposing flow ports 302 and 303. In this example, oil 308 is being introduced 305 to channel 300; however, it is noted that in another example, oil 308 may be removed from channel 300 as well. However, in this figure the pressures associated with inlets 306 and 307 are higher than in FIG. 2 (while still being equal), resulting in a much more constricted flow area 304 and a more controlled packing of drops 301 than as is illustrated in FIG. 2.

Figure 4:
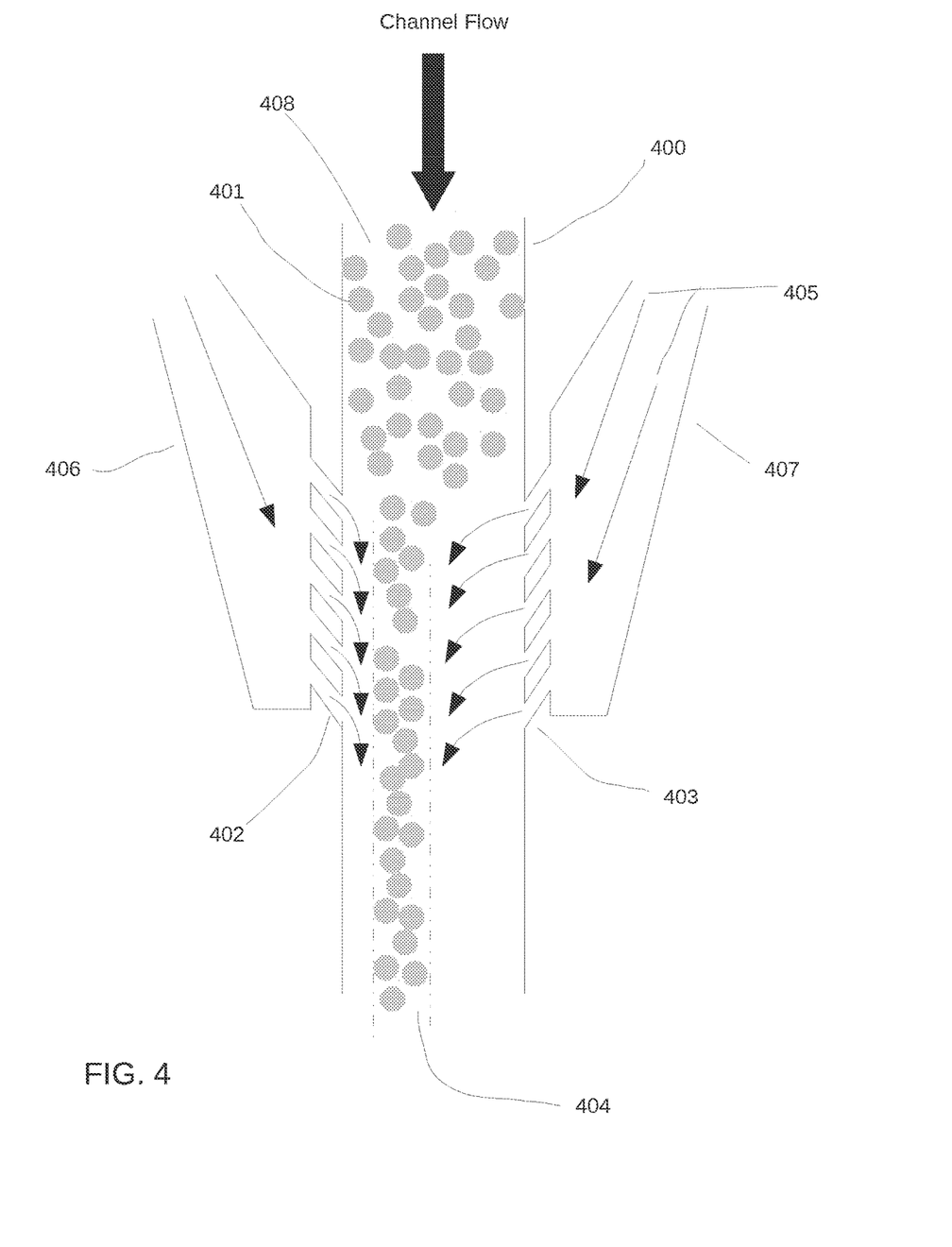
FIG. 4 is an illustration of an example of one embodiment of a microfluidic channel with incorporated additional inlet channels with one inlet 106 having a low pressure relative to the pressure of inlet channel 107, resulting in a shifted and significantly confined flow area for the drops relative to the physical boundaries of the channel itself.

FIG. 4 is an illustration of an example of one embodiment of the system for performing emulsion channel confinement. A microfluidic channel 400 contains drops 401 in an aqueous oil immersion (continuous phase fluid) 408. The drops flow down the channel 400 until more oil 408 is introduced 405 from inlet channels 406 and 407 via flow ports 402 and 403. In this example, oil 408 is being introduced 405 to channel 400; however, it is noted that in another example, oil 408 may be removed from channel 400 as well. However, in this figure the pressures associated with inlets 406 and 407 are not equal; inlet 406 has a relatively low pressure when compared to the pressure associated with inlet 407, resulting in a constricted yet off-center flow area 404. This same effect can be achieved by applying continuous phase from only one side of the microfluidic channel either by not applying pressure to from the opposing side of the channel or by only having ports on one wall of the microfluidic channel.

Figure 5:
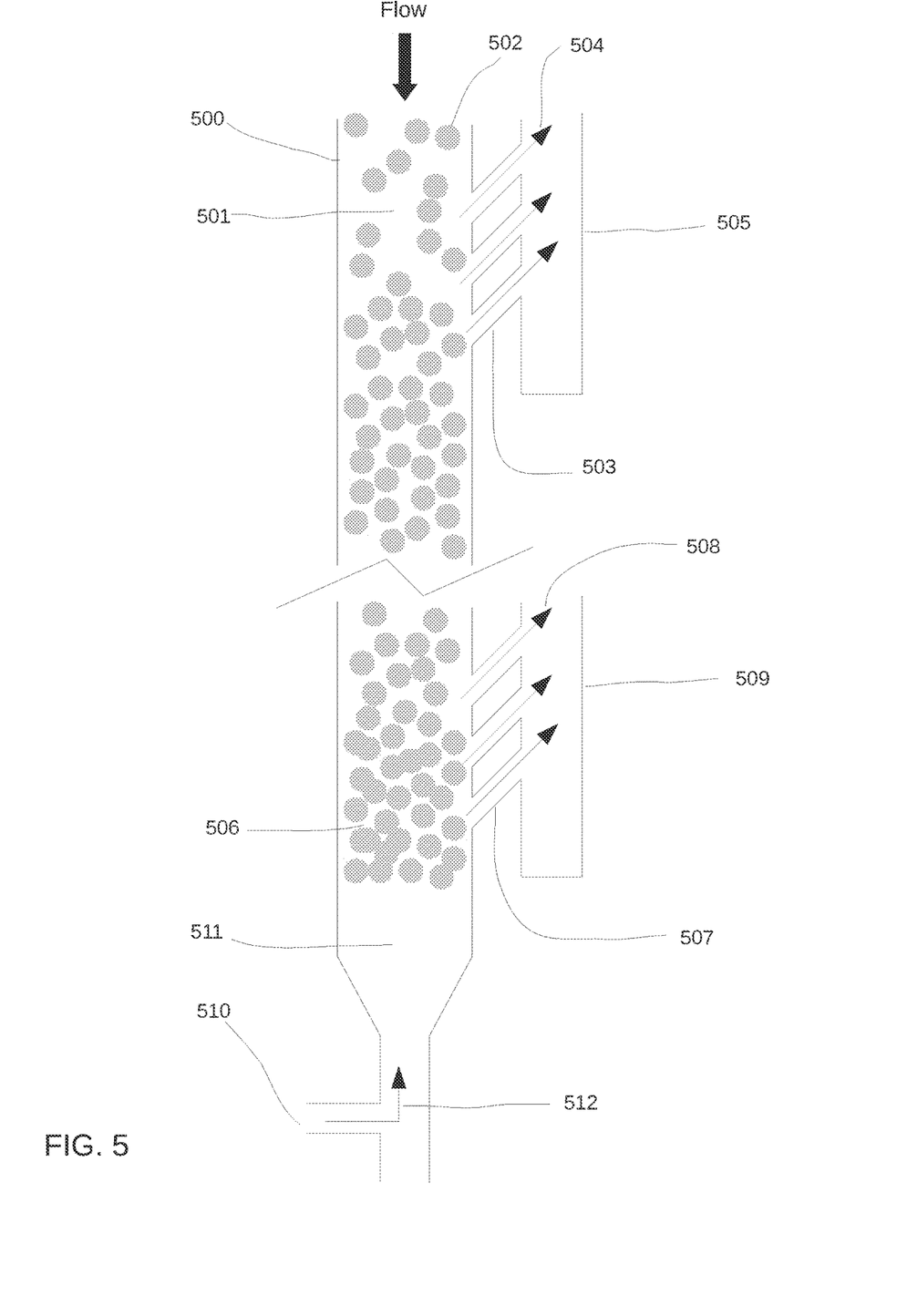
FIG. 5 is an illustration of an example of one embodiment of a microfluidic channel where oil is removed from the channel through the incorporation of oil-removing ports at multiple points along the channel. Downstream, while oil is being removed from the channel, a pressure source is introduced against the flow in the microfluidic channel to facilitate the packing of drops within a channel.

FIG. 5 is an illustration of an example of one embodiment of the system for the removal of oil to facilitate drop packing within a microfluidic channel. A microfluidic channel 500 contains drops 502 within an aqueous oil emersion 501. As the drops 502 flow downstream within channel 500, oil 501 is removed from channel 500 via ports 503 connected to an oil outlet channel 505. This causes the drops 502 to begin to arrange closer together within channel 500.

Downstream within FIG. 5, the drops 502 are gradually arranging closer together within channel 500. To facilitate the packing of drops 502 within the channel 500, a pressure source 512 is incorporated though an additional port 510. The pressure source 512 can be any number of aqueous solutions and/or fluids; however, in this example oil is used as an example. The pressure source 512 flows into channel 500 against the flow of the drops, creating a space 511 which, in conjunction with the removal 508 of oil via ports 507 into removal channel 509, results in the packing of drops 506. Once sufficient packing of drops 506 has been accomplished, the pressure source 512 is removed and drops are able to continue to flow downstream in a packed state 506.

Packing of Droplets Using Filler Drops

Also provided are systems and methods for packing droplets within a microfluidic channel. The systems can comprise a microfluidic channel through which droplets flow by being acted upon by a source of positive or negative pressure, wherein the pressure source comprises any fluid or combinations of fluids, including but not limited to, any gas or combination of gases or any liquid or combinations of liquids such that the droplets flow or stream through a microfluidic channel.

Figure 6:
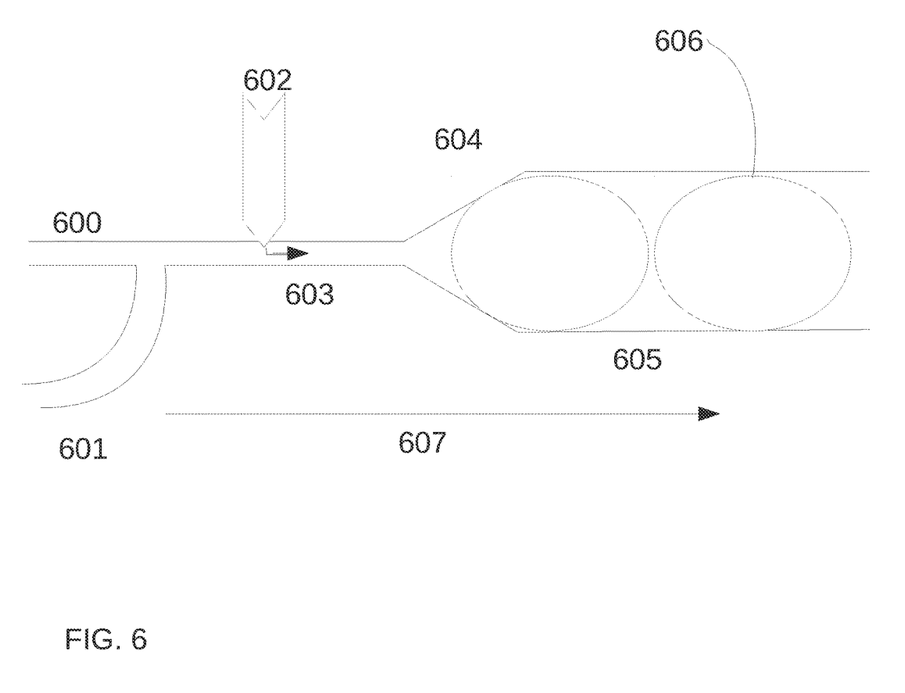
FIG. 6 illustrates a view of a microfluidic channel where simple phase droplets are being added to the channel via a perpendicular injection channel. The resulting drops are the large emulsion drops which serve the function of causing smaller/normal sized droplets to eventually pack the channel.

FIG. 6 illustrates an example of one embodiment of a system for performing the injection of a particular substance or phase into a microfluidic channel for the creation of filler drops is illustrated. In this example, the microfluidic channel 600 is in communication with an adjoining channel or inlet 601, which allows for the introduction of continuous phase (e.g., oil) into the channel. Moving down the channel in the direction of 607, another injection port 602 enters the channel 600. This injection channel 602 holds a volume of single phase for the creation of larger drops 606, flowing down the channel 600 in the direction of 603.

The single phase flowing from a controlled port 602, flows down the channel 603. The channel 600 slowly begins to widen 604, allowing for the filler drops to completely take up the space of the channel 605.

Figure 7:
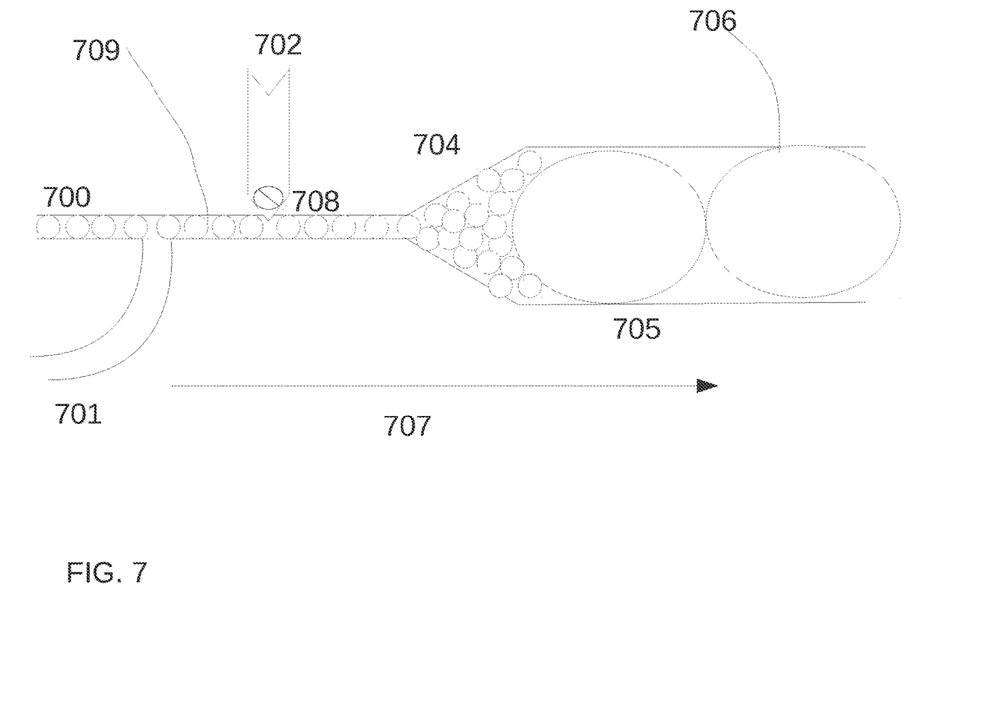
FIG. 7 illustrates a view of the same microfluidic channel that is described in FIG. 6, only now the simple phase injection is no longer creating large emulsion drops and the normal sized droplets are able to flow, resulting in packed droplets within the channel.

FIG. 7 illustrates the same system as FIG. 6. In this example, the larger drops 706 created by the single phase injected via 702 have moved into the widened channel 705 and are slowly flowing in the direction of 707. "Widened" in this context means that the cross-sectional area of the channel is increased such that droplets 709 have room to move past each other. When the regular droplets 709 are introduced into the channel 700 [not shown here], the inlet of 702 is essentially "shut off" via pressure change 708. This allows for the flow of the other droplets 709, and prevents the creation of larger drops 706 while also making sure to block any backflow into inlet 702.

The larger drops 706, which take up the diameter of the channel 705, force the smaller droplets 709 to slow down in direction 707, creating a "packing" situation within the channel 700/705. This in turn maintains the order of the drops within the channel 700, increasing the accuracy during analysis of the droplets downstream 707 [not shown here].

Exemplary Microfluidic Systems

The following is general information that can be applied to the embodiments described above. In one or more embodiments, the system comprises one or more injection inlet. The injection inlet may be of any shape, including but not limited to, circular, elliptical, triangular, rectangular and so forth. The injection inlet may have an average cross-sectional dimension of less than about 1 mm, less than about 100 µm, less than about 10 µm, less than about 1 µm, less than about 100 nm, and so forth. The injection inlet may be flush with the microfluidic channel or, alternatively, may protrude into the microfluidic channel.

In some embodiments, a sample is present in aqueous droplets within a vehicle (i.e., a continuous fluid) in a microfluidic device. In one aspect of this embodiment, multiple samples (i.e., more than one) may be present together in the same vehicle and/or may be separated into individual samples within individual vehicles at any point during an assay(s). Additionally, a vehicle comprising one or more samples may become larger or smaller (e.g., by way of inflation or partitioning, respectively) in size, volume or content during the performance of an assay. A vehicle may be amplified and/or subdivided one or more times during the performance of an assay. The system may optionally further perform a "cascading assay," which is a series of multiple (i.e., more than one) assays, wherein each assay may be the same or different, and wherein each assay in the series may further comprise one or more process or step. In one aspect of this embodiment, the sample is present on a carrier within a vehicle (e.g., droplets in an emulsion) in a microfluidic device.

In one embodiment of the present invention, the system is an integrated microfluidic device.

The system can further comprise a mechanism for disrupting at least a portion of the interface between a drop flowing in a microfluidic channel and a fluid and/or emulsion in an injection channel, resulting in injection of a relatively controlled volume either into or out of a drop and, hence, a respective increase or decrease in the volume of the drop relative to prior to injection. An "interface", as used herein when referring to the interface between a drop and a fluid and/or emulsion, is one or more region where two immiscible or partially immiscible phases (e.g., a drop and a fluid or emulsion) are capable of interacting with each other. Upon disruption of the interface, there is a relative flow of volume either from the injection channel and into the drop or out of the drop and into the injection channel, all via the injection inlet associated with the particular injection channel. As the drop continues to flow past the injection inlet, there is a shearing force that breaks the contact between the drop and the fluid and/or emulsion, followed by restoration of the interface and end of volume flow between the drop and the fluid and/or emulsion. Droplet injectors (also referred to as "picoinjectors"), i.e., injectors of small amounts of fluid, e.g., from a portion of one drop, into another drop, are described in, e.g., US 2012/0132288 and WO 2012/135259.

In one or more embodiments, the volume injected into or out of each drop may be any suitable amount, depending on the embodiment, as will be appreciated and understood by one of skill in the art. For example, the volume injected into or out of each drop may be less than about 10 µL, less than about 1 µL, less than about 100 nL, less than about 10 nL, less than about 1 nL, less than about 100 pL, less than about 10 pL, less than about 1 pL and so forth.

Exemplary system components are described in, e.g., US2011/0267457, US2011/0151578, US2011/0218123, US2012/0222748, US2011/0218123, 2012/0222748, WO2012/135201, WO2012/135259, WO2014/043388, WO 2012/135327.

The direction and rate of volume may be controlled by controlling various factors of the drops, fluids, emulsions, and/or system components, including but not limited to, the mechanism of disrupting the interface between the drop and the fluid and/or emulsion (discussed further below); the curvature and/or velocity of the drop; the pressure in the injection channel and/or the microfluidic channel relative to one another; the surface tension of the drop; the surface tension of the fluid and/or emulsion; or the geometry of the injection inlet. The above factors may, in some instances, result in forces acting on the system, as described below.

For example, the injection inlet can be constructed such that the pressure of the system may be balanced to substantially prevent the fluid and/or emulsion in the injection channel from flowing into the microfluidic channel unless there is a pressure drop present in the microfluidic channel and in direct contact with an injection interface, and there is sufficient activation energy to foster injection of volume between the drop in the microfluidic channel and the fluid and/or emulsion in an injection channel. Accordingly, when there is no drop in direct contact with an injection interface or, in instances where there is a drop in direct contact with an injection interface but there is no mechanism for disrupting the interface between the drop and a fluid and/or emulsion, there is substantially no net positive or net negative flow of volume into or out of the drop or into or out of an injection channel because the forces pushing volume out of an injection channel and into the drop are substantially balanced by the forces pushing volume out of the drop and into the injection channel. Accordingly, in some embodiments, a system can be constructed to substantially prevent dripping of fluid and/or emulsion from the injection channel into the microfluidic channel when there is no drop in direct contact with an injection interface or, in instances where there is a drop in direct contact with an injection interface but there is no mechanism for disrupting the interface between the drop and a fluid and/or emulsion.

The mechanism for disrupting the interface between a drop and a fluid and/or emulsion may be selected from any passive or active method, or combinations thereof, known and appreciated by one of skill in the art. Xu, et al., "Drop Coalescence in Microfluidic Systems", Micro and Nanosystems (2011) vol. 3, no. 2, pp. 131-136, the entirety of which is incorporated herein by reference, describes many interface disruption mechanisms in the context of drop coalescence but the same apply for injection of multiple substantially controlled volumes into or out of a drop, as will be known, understood and appreciated by one of skill in the art.

Passive methods for disrupting the interface do not require external energy and can rely primarily on the structure and surface properties of the microfluidic channel and associated injection channels and respective injection inlets. Passive methods for disrupting the interface include, but are not limited to, flow trapping and surface modification, which are further described by Xu, et al. and will be known and appreciated by one of skill in the art.

"Inflation," as used herein, refers to increasing the volume or content of a vehicle by injecting or other means of transferring fluid or other components into the vehicle such as by diffusion or osmotic controlled diffusion or, in the case of a sample, refers to increasing the volume of content of a sample to allow for amplification (e.g., PCR, cell division or other mechanism for increasing the content or volume of a sample) such that the size, volume and/or content of the sample or vehicle becomes relatively larger than prior to inflation. "Partitioning," as used herein, refers to dividing, subdividing and/or partitioning of a sample or vehicle such that the size, volume and/or content of the sample or vehicle become relatively smaller than prior to partitioning.

In one example, a sample within a vehicle (e.g., a droplet) may be amplified (e.g., by PCR, cell division or other mechanism for increasing the content of a sample) one, two or multiple times comprising multiple samples and/or partitioned one, two or multiple times into multiple individual samples within a cascading assay. Likewise, in another example, a vehicle containing a sample may be inflated one, two or multiple times and/or partitioned one, two or multiple times into multiple vehicles, wherein each vehicle may comprise one or more samples, within a cascading assay. Moreover, in yet another example, a sample present in a first vehicle may be injected into a second vehicle, wherein the second vehicle may or may not comprise one or more additional samples, within a cascading assay. Additionally, in still another example, a sample may be amplified on the surface of a carrier (e.g., a bead). In this example, the carrier may further be present within a vehicle comprising multiple carriers, wherein each carrier comprises at least one sample on its surface, and wherein each sample is subsequently separated from its respective carrier followed by selective partitioning of one or more samples from one or more other samples as the vehicle is partitioned one or more times, within a cascading assay. In this example, after a sample is separated from its respective carrier, the carrier may or may not be removed from the vehicle as the vehicle is partitioned one or more times.

In one embodiment, the system is an integrated microfluidic device. A "microfluidic device", as used herein, is a device that enables a means of effecting a deterministic function on liquid or gas fluids at small scales typically measured in volumes such as, for example, milliliter (mL), microliter (µL), nanoliter (nL), picoliter (pL), or femtoliter (fL) volumes and/or by physical scale such as millimeter (mm), micrometer (μm) (also referred to as "micron"), nanometer (nm), and so forth. Functions may include mixing, splitting, sorting, heating, and so forth. Microfluidic devices may comprise microfluidic channels as a means for transferring fluids or samples from one point to another and are typically of uniform cross section in the mm, μm or nm scale.

A wide variety of methods and materials exists and will be known and appreciated by one of skill in the art for construction of microfluidic channels and networks thereof, such as those described, for example, in U.S. Pat. No. 8,047,829 and U.S. Patent Application Publication No. 20080014589, each of which is incorporated herein by reference in its entirety. For example, the microfluidic channel may be constructed using simple tubing, but may further involve sealing the surface of one slab comprising open channels to a second flat slab. Materials into which microfluidic channels may be formed include silicon, glass, silicones such as polydimethylsiloxane (PDMS), and plastics such as poly(methyl-methacrylate) (known as PMMA or "acrylic"), cyclic olefin polymer (COP), and cyclic olefin copolymer (COC). The same materials can also be used for the second sealing slab. Compatible combinations of materials for the two slabs depend on the method employed to seal them together. The microfluidic channel may be encased as necessary in an optically clear material to allow for optical excitation (resulting in, e.g., fluorescence) or illumination (resulting in, e.g., selective absorption) of a sample as necessary, and to allow for optical detection of spectroscopic properties of light from a sample, as the sample is flowing through the microfluidic channel. Preferred examples of such optically clear materials that exhibit high optical clarity and low autofluorescence include, but are not limited to, borosilicate glass (e.g., SCHOTT BOROFLOAT® glass (Schott North America, Elmsford N.Y.)) and cyclo-olefin polymers (COP) (e.g., ZEONOR® (Zeon Chemicals LP, Louisville Ky.)).

FIG. 1 is an illustration of an example of one embodiment of a system for performing a cascading assay. In this example, a two-stage integrated emulsion-based microfluidic system is illustrated, wherein the system may be used to perform a cascading assay comprising a first stage and a second stage, as discussed in greater detail below. The system 140 in this example provides for the performance of various functions, including but not limited to, target nucleic acid selection and amplification, assay, detection and data analysis. However, the system, samples and reagents may be modified accordingly to perform any type of assay.

In the first stage of the cascading assay performed by the system depicted in FIG. 1, sample DNA is introduced into a sample vessel 148. PCR primers that are uniquely labeled (e.g., with unique fluorophores) and contained within drops (e.g., primer drops, i.e., drops comprising one or more oligonucleotide primer of different sequence) in the form of an emulsion are introduced into reagent vessels 141 and 142. The primer drops in reagent vessel 141 flow in primer channel 144 and primer drops in reagent vessel 142 flow in primer channel 143. Primer channel 143 intersects with primer channel 144 at microfluidic channel 145. The primer drops flow in primer channels 143 and 144 in a manner such that the primer drops enter microfluidic channel 145 in an alternating manner. DNA polymerase is introduced into reagent vessel 149. Sample vessel 148 and reagent vessel 149 each further comprise selection and amplification reagents and components such as, but not limited to, PCR primers, buffers, dNTPs, and BSA (bovine serum albumin).

In FIG. 1, possible locations where the the aspects illustrated in FIGS. 2-7 could be introduced into the system of FIG. 1 include, e.g, at positions 162, 164 and/or 168.

In this example, primer drops in reagent vessel 141 are labeled (e.g., fluorescently) differently than those in reagent vessel 142 such that the labels may be monitored at a final detection stage. Upon entering microfluidic channel 145, the primer drops are spaced relatively uniformly with oil from vessel 146 (or, alternatively, any fluid capable of maintaining drop separation). This results in relatively uniformly spaced primer drops 147, wherein the primer drops 147 are spaced at a relatively uniform distance at a particular flow rate. Each of the uniformly spaced primer drops 147 are first injected with sample from sample vessel 148 by way of the sample vessel injector 150, followed by injection with DNA polymerase from reagent vessel 149 by way of the reagent injector 151.

This process results in the formation of relatively larger drops 152, wherein each drop comprises sample DNA, primers and PCR reagents, flowing within the microfluidic channel 145. The drops 152 next flow through a serpentine-like microfluidic channel 155 while repeatedly passing through two temperature zones, first temperature zone 153 and second temperature zone 154, respectively, as part of the process of undergoing PCR amplification of the sample DNA. First temperature zone (denaturation temperature zone) 153 allows for the denaturing of the sample DNA. Alternatively, the system may be modified to allow for a three-step PCR process whereby the sample DNA is PCR amplified by being subjected to multiple controlled temperature zones within the system, as will be understood and appreciated by one of skill in the art. As the drops 152 flow through the serpentine-like microfluidic channel 155, they pass through alternating temperature zones 153 and 154 as part of the PCR process resulting in PCR product drops 156 comprising PCR-amplified sample DNA.

The system illustrated in FIG. 1 further comprises a DNA probe drop vessel 157 comprising a library of DNA probes contained within drops. Drops comprising DNA probes (probe drops) 160 are injected from DNA probe drop vessel 157 by way of DNA probe drop injector 171, which intersects with microfluidic channel 159. As the probe drops 160 are injected into microfluidic channel 159, they are relatively uniformly spaced by oil injected from oil vessel 158 by way of oil injector 172.

In the second stage of the cascading assay performed by the system depicted in FIG. 1, as the PCR products drops 156 flow through the serpentine-like microfluidic channel 155, a portion or all of each individual PCR product drop 156 may be injected into one or more probe drops 160 flowing in microfluidic channel 159 by way of injector 161 at the point at which the serpentine-like microfluidic channel 155 intersects with microfluidic channel 159. Next, the probe drops 160 are injected with detection assay reagents (e.g., reagents for a sequencing reaction, including but not limited to a hybridization-based sequencing reaction) from reagent vessel 163 by way of reagent vessel injector 162. Alternatively, the system 140 in this example may be modified such that the order of injection may be reversed, i.e., the detection assay reagents are injected into the probe drops 160 prior to injection of PCR product drops 156. In this example, electrodes (not shown) provide a mechanism for disrupting the interface between the probe drops 160 and a fluid and/or emulsion comprising the material (PCR product drops and detection assay reagents, in this example) being injected into the probe drops 160. Despite the order of injection, the result is drops comprising probe plus amplified sample, referred to herein as pre-incubation drops 173.

In one embodiment, hybridization is detected as described in WO 2012/078710, which is incorporated herein by reference in its entirety. Briefly, this method can involve generating a target nucleic acid amplicon comprising florescent label or other detectable substance, e.g., a nucleic acid sequence covalently-linked fluorescent label, and annealed to an inhibitor polynucleotide comprising a quencher such that hybridization of the inhibitor polynucleotide to the target nucleic acid results in quenching of the fluorescent label signal. The detector nucleic acid (i.e., the sequence associated with the target to which the inhibitor polynucleotide hybridizes) can be part of the target sequence amplicon or can be added to the target nucleic acid sequence. A test primer (i.e., one or more primer in a reaction partition) within the probe drops (160) can be combined with the target nucleic acid/inhibitor polynucleotide duplex from a PCR product drop (156) and a strand displacing polymerase (e.g., from 163) such that if the primer anneals to the target nucleic acid, the polymerase extends the primer and displaces the inhibitor polynucleotide, thereby generating a fluorescent signal, indicating that the primer has hybridized. If the primer does not hybridize, the quencher is not displaced and no (or reduced) signal is detected. Note, in an alternative configuration, the quencher and fluorescent label can also be linked to the target nucleic acid and the inhibitor polynucleotide, respectively. The strand displacement assay can occur isothermally and thus does not require thermocycling. In some embodiments, the target nucleic acid will be generated as an amplicon, having a 5' fluorescent label and optionally, a 3' stem (i.e., double stranded end formed by hybridization of an oligonucleotide to the 3' end) or stem loop.

Excess oil may be removed from microfluidic channel 159 by an oil remover 164 and collected in waste vessel 165. Removing excess oil allows for tight packing as the pre-incubation drops 173 next pass through incubation temperature zone 166 while flowing in a relatively uniform manner allowing for each drop to undergo relatively the same amount of incubation time and to remain a member of a collective unit of pre-incubation drops 173 as opposed to receiving a variable incubation time or straying from the other pre-incubation drops. The temperature of incubation temperature zone 166 may comprise one, two or multiple temperatures; one, two or multiple temperature gradients; one, two or multiple temperature cycles, or any combination of the above. Following incubation, the drops are referred to as post-incubation drops 174, which then pass through the temperature zone 166 in a relatively uniform manner by being spaced with oil from oil vessel 167 via oil injector 168. The relatively uniform spacing of the probe drops 160 must be sufficient to separate the post-incubation drops 174 for individual detection and analysis by the detector 169 and the user. After detection, the post-incubation drops 174 are collected in a waste well 170.

In some embodiments, a droplet is an aqueous droplet that is surrounded by an immiscible carrier fluid (e.g., oil). In some embodiments, a droplet is an oil droplet that is surrounded by an immiscible carrier fluid (e.g., an aqueous solution). In some embodiments, the droplets described herein are relatively stable and have minimal coalescence between two or more droplets. In some embodiments, less than 0.0001%, 0.0005%, 0.001%, 0.005%, 0.01%, 0.05%, 0.1%, 0.5%, 1%, 2%, 3%, 4%, 5%, 6%, 7%, 8%, 9%, or 10% of droplets generated from a sample coalesce with other droplets.

Methods and compositions for partitioning (e.g., forming droplets from) a sample are described, for example, in published patent applications WO 2010/036352, US 2010/0173394, US 2011/0092373, US 2011/0092376, US2012/0222748; WO2013/09573; and US 2011/0218123 the entire content of each of which is incorporated by reference herein.

In some embodiments, the droplet is formed by flowing an oil phase through an aqueous solution comprising the label (s) to be detected. In some embodiments, the aqueous sample comprising the label(s) to be detected comprises a buffered solution and reagents for detecting the label(s). The oil for the oil phase may be synthetic or naturally occurring. In some embodiments, the oil comprises carbon and/or silicon. In some embodiments, the oil comprises hydrogen and/or fluorine. Exemplary oils include, but are not limited to, silicone oil, mineral oil, fluorocarbon oil, vegetable oil, or a combination thereof.

The oil phase may comprise a fluorinated base oil which may additionally be stabilized by combination with a fluorinated surfactant such as a perfluorinated polyether. In some embodiments, the base oil comprises one or more of a HFE 7500, FC-40, FC-43, FC-70, or another common fluorinated oil. In some embodiments, the oil phase comprises an anionic fluorosurfactant. In some embodiments, the anionic fluorosurfactant is Ammonium Krytox (Krytox-AS), the ammonium salt of Krytox FSH, or a morpholino derivative of Krytox FSH. Krytox-AS may be present at a concentration of about 0.1%, 0.2%, 0.3%, 0.4%, 0.5%, 0.6%, 0.7%, 0.8%, 0.9%, 1.0%, 2.0%, 3.0%, or 4.0% (w/w). In some embodiments, the concentration of Krytox-AS is about 1.8%. In some embodiments, the concentration of Krytox-AS is about 1.62%. Morpholino derivative of Krytox FSH may be present at a concentration of about 0.1%, 0.2%, 0.3%, 0.4%, 0.5%, 0.6%, 0.7%, 0.8%, 0.9%, 1.0%, 2.0%, 3.0%, or 4.0% (w/w). In some embodiments, the concentration of morpholino derivative of Krytox FSH is about 1.8%. In some embodiments, the concentration of morpholino derivative of Krytox FSH is about 1.62%.

In some embodiments, the oil phase further comprises an additive for tuning the oil properties, such as vapor pressure, viscosity, or surface tension. Non-limiting examples include perfluorooctanol and 1H,1H,2H,2H-Perfluorodecanol. In some embodiments, 1H,1H,2H,2H-Perfluorodecanol is added to a concentration of about 0.05%, 0.06%, 0.07%, 0.08%, 0.09%, 0.1%, 0.2%, 0.3%, 0.4%, 0.5%, 0.6%, 0.7%, 0.8%, 0.9%, 1.0%, 1.25%, 1.50%, 1.75%, 2.0%, 2.25%, 2.5%, 2.75%, or 3.0% (w/w). In some embodiments, 1H,1H,2H,2H-Perfluorodecanol is added to a concentration of about 0.18% (w/w).

In some embodiments, the droplets that are generated are substantially uniform in shape and/or size. For example, in some embodiments, the droplets are substantially uniform in average diameter. In some embodiments, the droplets that are generated have an average diameter of about 0.001 microns, about 0.005 microns, about 0.01 microns, about 0.05 microns, about 0.1 microns, about 0.5 microns, about 1 microns, about 5 microns, about 10 microns, about 20 microns, about 30 microns, about 40 microns, about 50 microns, about 60 microns, about 70 microns, about 80 microns, about 90 microns, about 100 microns, about 150 microns, about 200 microns, about 300 microns, about 400 microns, about 500 microns, about 600 microns, about 700 microns, about 800 microns, about 900 microns, or about 1000 microns. In some embodiments, the droplets that are generated have an average diameter of less than about 1000 microns, less than about 900 microns, less than about 800 microns, less than about 700 microns, less than about 600 microns, less than about 500 microns, less than about 400 microns, less than about 300 microns, less than about 200 microns, less than about 100 microns, less than about 50 microns, or less than about 25 microns. In some embodiments, the droplets that are generated are non-uniform in shape and/or size.

In some embodiments, the droplets that are generated are substantially uniform in volume. For example, in some embodiments, the droplets that are generated have an average volume of about 0.001 nL, about 0.005 nL, about 0.01 nL, about 0.02 nL, about 0.03 nL, about 0.04 nL, about 0.05 nL, about 0.06 nL, about 0.07 nL, about 0.08 nL, about 0.09 nL, about 0.1 nL, about 0.2 nL, about 0.3 nL, about 0.4 nL, about 0.5 nL, about 0.6 nL, about 0.7 nL, about 0.8 nL, about 0.9 nL, about 1 nL, about 1.5 nL, about 2 nL, about 2.5 nL, about 3 nL, about 3.5 nL, about 4 nL, about 4.5 nL, about 5 nL, about 5.5 nL, about 6 nL, about 6.5 nL, about 7 nL, about 7.5 nL, about 8 nL, about 8.5 nL, about 9 nL, about 9.5 nL, about 10 nL, about 11 nL, about 12 nL, about 13 nL, about 14 nL, about 15 nL, about 16 nL, about 17 nL, about 18 nL, about 19 nL, about 20 nL, about 25 nL, about 30 nL, about 35 nL, about 40 nL, about 45 nL, or about 50 nL.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. A method of controlling aqueous droplets in an emulsion comprising a non-aqueous continuous fluid, the method comprising,
providing a microfluidic channel defined by two substantially parallel or non-parallel walls, wherein each wall comprises two or more opposing ports, wherein said microfluidic channel contains an emulsion comprising aqueous droplets in the continuous non-aqueous fluid, and wherein the two or more opposing ports include an upstream port and a downstream port and wherein the upstream port in each wall introduces non-emulsion continuous non-aqueous fluid into the microfluidic channel at a first pressure and wherein the downstream port in each wall introduces non-emulsion continuous non-aqueous fluid into the microfluidic channel at a second pressure;
causing the emulsion to flow from an upstream position in the microfluidic channel to a downstream position in the channel while introducing non-emulsion continuous non-aqueous fluid into the microfluidic channel from the ports, such that the aqueous droplets in the emulsion are moved away from the walls of the microfluidic channel at the downstream position and are more densely packed at the downstream position compared to the upstream position.

2. The method of claim 1, wherein non-emulsion continuous non-aqueous fluid from one or more port on a first wall of the microfluidic channel flows at a higher pressure than non-emulsion continuous non-aqueous fluid from port(s) of the opposing wall such that a majority of droplets at the downstream position are closer to the opposing wall than to the first wall of the microfluidic channel.

3. The method of claim 1, wherein the first pressure and the second pressure are the same.

4. The method of claim 1, wherein the first pressure is higher than the second pressure.

5. The method of claim 1, wherein the first pressure is lower than the second pressure.

6. The method of any of claim 1, wherein the ports provide fluid communication between the microfluidic channel and one or more side channels, wherein the side channels and the microfluidic channel form an angle less than 90 degrees as measured from the side channel and the upstream portion of the microfluidic channel.

7. The method of claim 6, wherein the angle is between 30-60 degrees.

8. A method of removing continuous non-aqueous fluid from an emulsion, the method comprising
providing a microfluidic channel defined by two substantially parallel walls, wherein at least one wall comprises one or more port(s), wherein the ports provide fluid communication between the microfluidic channel and one or more side channels, wherein said microfluidic channel contains an emulsion comprising aqueous droplets in the continuous non-aqueous fluid;
causing the emulsion to flow from an upstream position in the microfluidic channel to a downstream position in the microfluidic channel while removing non-emulsion continuous non-aqueous fluid from the emulsion in the microfluidic channel via the port(s), wherein opposing walls of the side channels are parallel and the microfluidic channel form angles less than 90 degrees as measured from the side channel and the upstream position of the microfluidic channel, thereby removing continuous non-aqueous fluid from the emulsion.

9. The method of claim 8, wherein the angle is between 30-60 degrees.

10. The method of claim 8, further comprising providing at the downstream position a fluid pressure opposing the flow of the emulsion, thereby packing the droplets of the emulsion into a more dense arrangement than occurred at the upstream position.

11. The method of claim 10, wherein the fluid pressure is provided by a fluid inserted into the microfluidic channel by a downstream port in fluid communication with the microfluidic channel.

12. The method of claim 11, wherein the fluid inserted by the downstream port is a continuous non-aqueous fluid.

13. The method of claim 11, wherein the fluid is an aqueous fluid.

* * * * *